(12) United States Patent
Jeon

(10) Patent No.: US 11,238,740 B2
(45) Date of Patent: *Feb. 1, 2022

(54) APPARATUS FOR VEHICLE DRIVING ASSISTANCE

(71) Applicant: MANDO CORPORATION, Pyeongtaek-si (KR)

(72) Inventor: Kyung Geun Jeon, Pyeongtaek-si (KR)

(73) Assignee: Mando Corporation, Pyeongtaek-si (KR)

( * ) Notice: Subject to any disclaimer, the term of this patent is extended or adjusted under 35 U.S.C. 154(b) by 280 days.

This patent is subject to a terminal disclaimer.

(21) Appl. No.: 16/547,036

(22) Filed: Aug. 21, 2019

(65) Prior Publication Data

US 2019/0378416 A1 Dec. 12, 2019

Related U.S. Application Data

(63) Continuation of application No. 16/214,959, filed on Dec. 10, 2018, now Pat. No. 10,431,096, which is a
(Continued)

(30) Foreign Application Priority Data

Jul. 19, 2016 (KR) .......................... 10-2016-0091297

(51) Int. Cl.
*G08G 1/16* (2006.01)
*B62D 15/02* (2006.01)
(Continued)

(52) U.S. Cl.
CPC ............. *G08G 1/167* (2013.01); *B62D 6/002* (2013.01); *B62D 15/025* (2013.01);
(Continued)

(58) Field of Classification Search
CPC .... G08G 1/167; G05D 1/0246; G05D 1/0061; G05D 1/0077; G05D 2201/0213; B62D 15/026; B62D 6/002; B62D 15/025
See application file for complete search history.

(56) References Cited

U.S. PATENT DOCUMENTS

2004/0215393 A1   10/2004   Matsumoto et al.
2005/0177308 A1   8/2005    Tange et al.
(Continued)

FOREIGN PATENT DOCUMENTS

DE   10017279 A1   10/2000
DE   10349631 A1   5/2005
(Continued)

OTHER PUBLICATIONS

Notice of Allowance issued in related U.S. Appl. No. 16/214,959 dated May 22, 2019.
(Continued)

*Primary Examiner* — Russell Frejd
(74) *Attorney, Agent, or Firm* — Morgan, Lewis & Bockius LLP

(57) ABSTRACT

An apparatus for assisting driving of a host vehicle provides stable control of the host vehicle by using road conditions including intersections, crosswalks and the like, forward lane markings, and a preceding vehicle. The apparatus includes an image sensor to capture images of an area in front of the host vehicle, and a controller configured to recognize a road section having no lane markings on a drive path, or recognize forward lane markings. The controller performs lateral control of the host vehicle selectively based on the forward lane markings and the recognized preceding vehicle according to whether the road section having no lane markings is recognized.

18 Claims, 11 Drawing Sheets

Related U.S. Application Data continuation of application No. 15/652,237, filed on Jul. 18, 2017, now Pat. No. 10,490,083.

(51) Int. Cl.
  *G05D 1/02* (2020.01)
  *B62D 6/00* (2006.01)
  *G05D 1/00* (2006.01)

(52) U.S. Cl.
  CPC ......... *B62D 15/026* (2013.01); *G05D 1/0061* (2013.01); *G05D 1/0077* (2013.01); *G05D 1/0246* (2013.01); *G05D 2201/0213* (2013.01)

(56) References Cited

U.S. PATENT DOCUMENTS

| | | |
|---|---|---|
| 2010/0076684 A1 | 3/2010 | Schiffmann et al. |
| 2015/0307095 A1 | 10/2015 | Aso |

FOREIGN PATENT DOCUMENTS

| | | |
|---|---|---|
| DE | 102006012997 A1 | 9/2007 |
| DE | 102010014499 A1 | 10/2011 |
| KR | 2005-0068992 A | 7/2005 |
| KR | 2014-0123742 A | 10/2014 |
| WO | 2013-171089 A1 | 11/2013 |

OTHER PUBLICATIONS

Non-Final Office Action issued in related U.S. Appl. No. 16/214,959 dated Jan. 30, 2019.
Office Action issued in German Patent Application No. 102017212362.1 dated Jan. 19, 2021.

[FIG. 1]
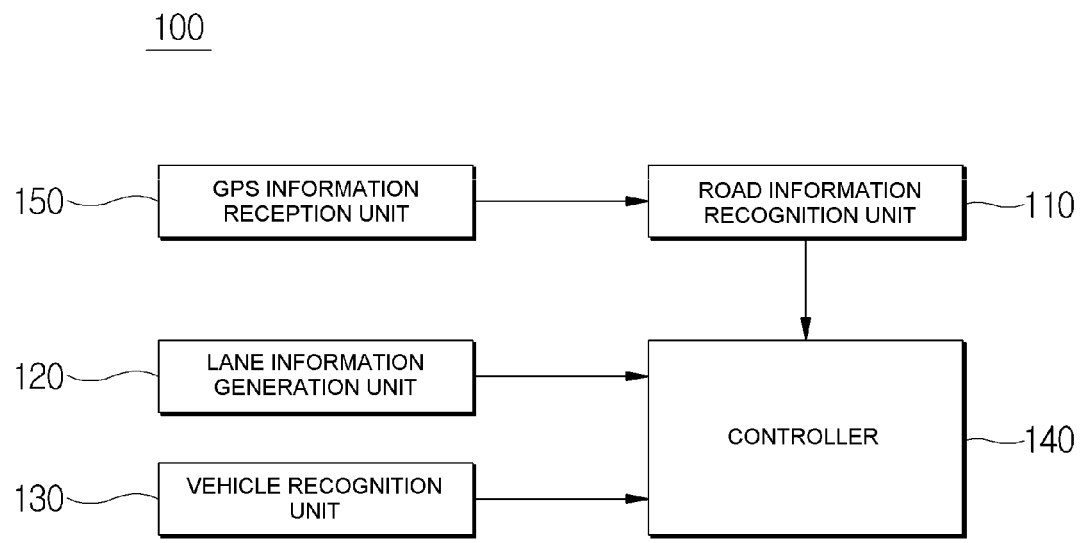

[FIG. 2]
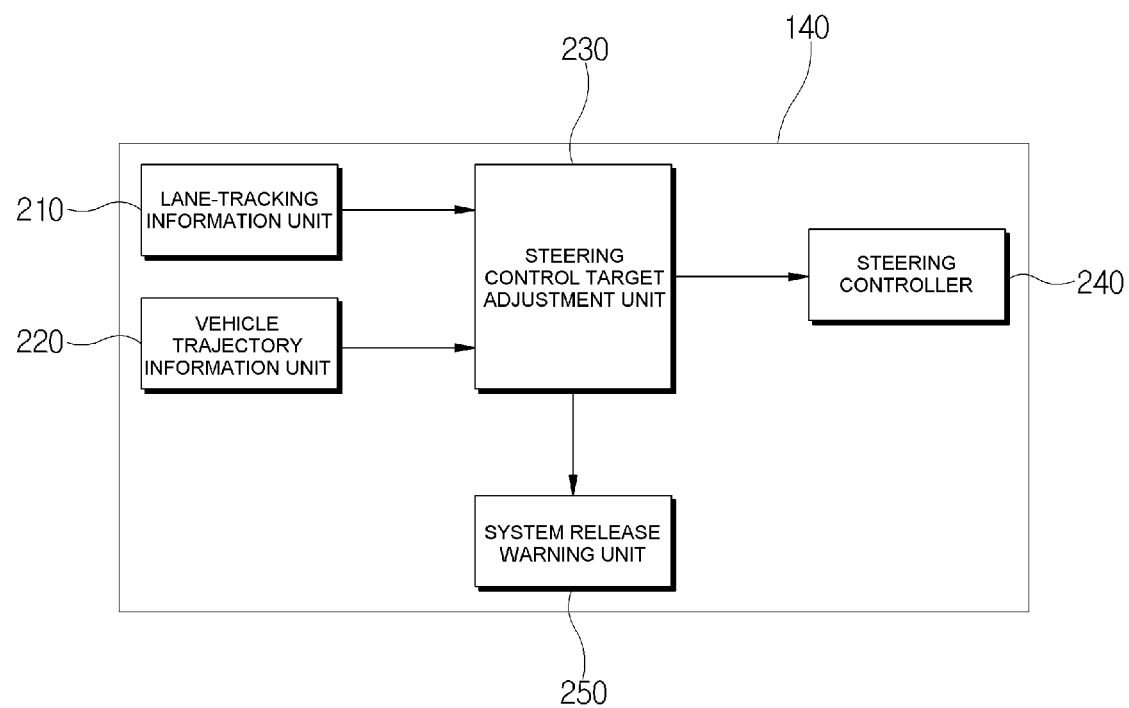

[FIG. 3]
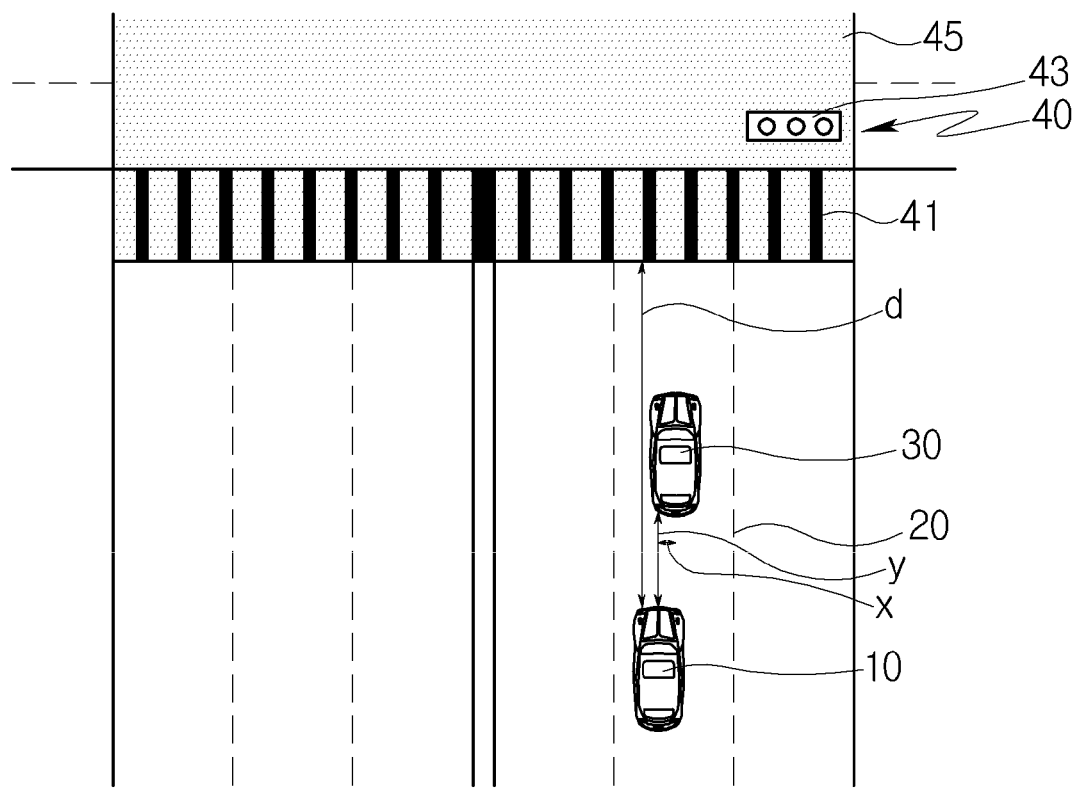

[FIG. 4]
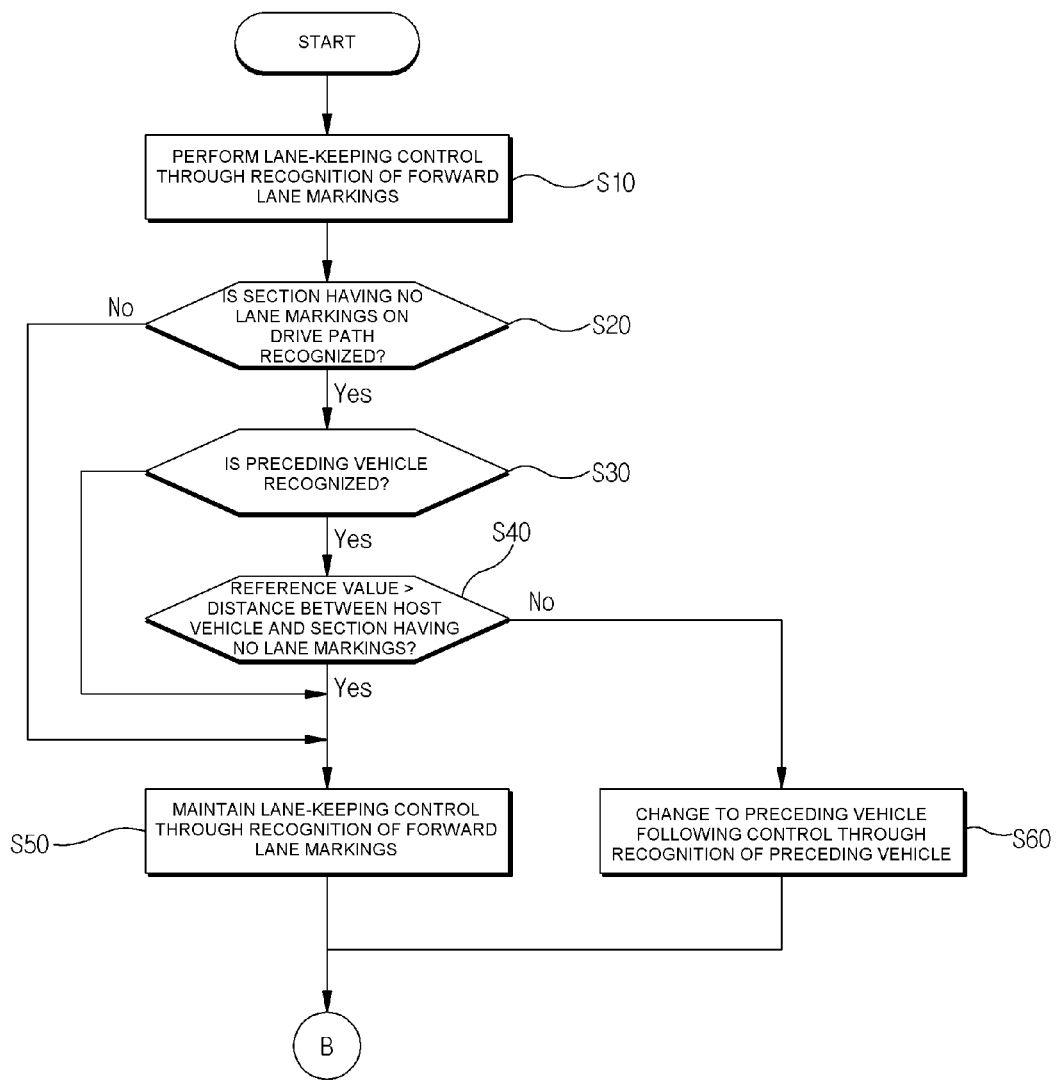

[FIG. 5]
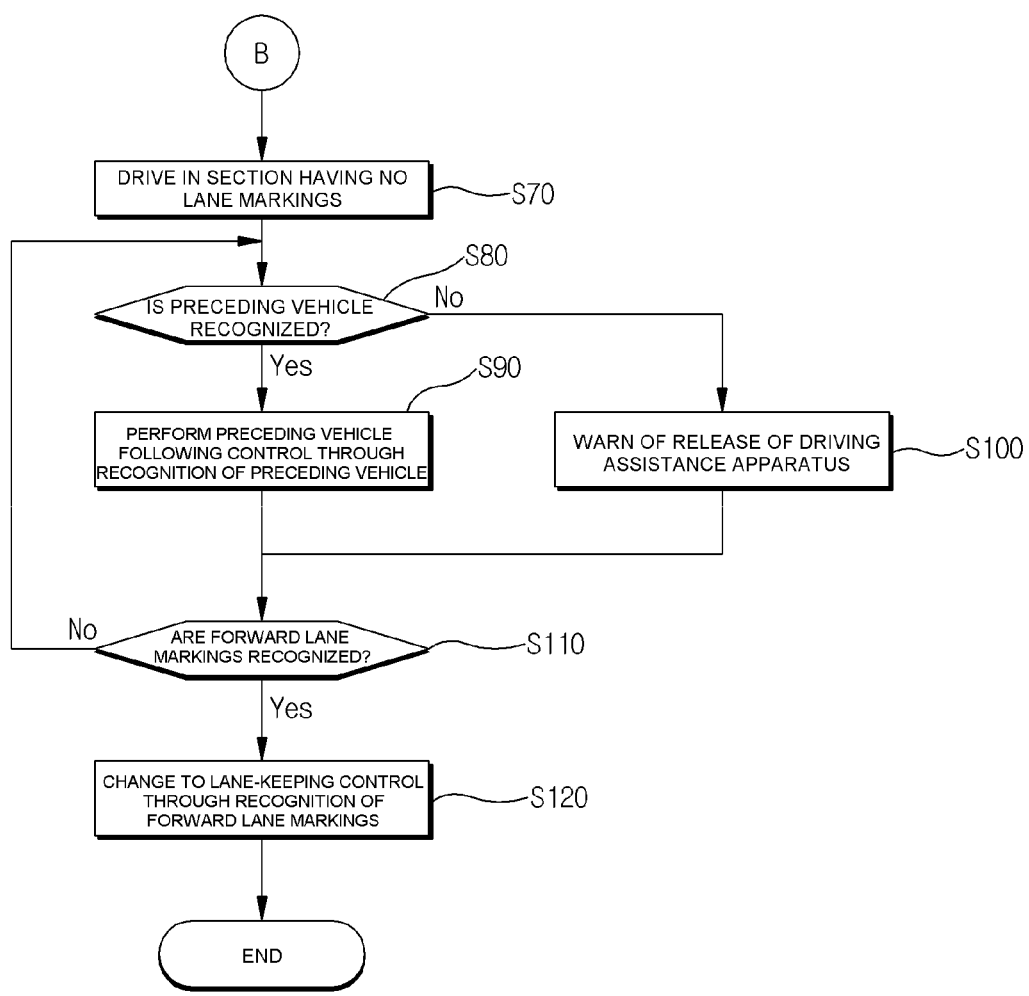

[FIG. 6]
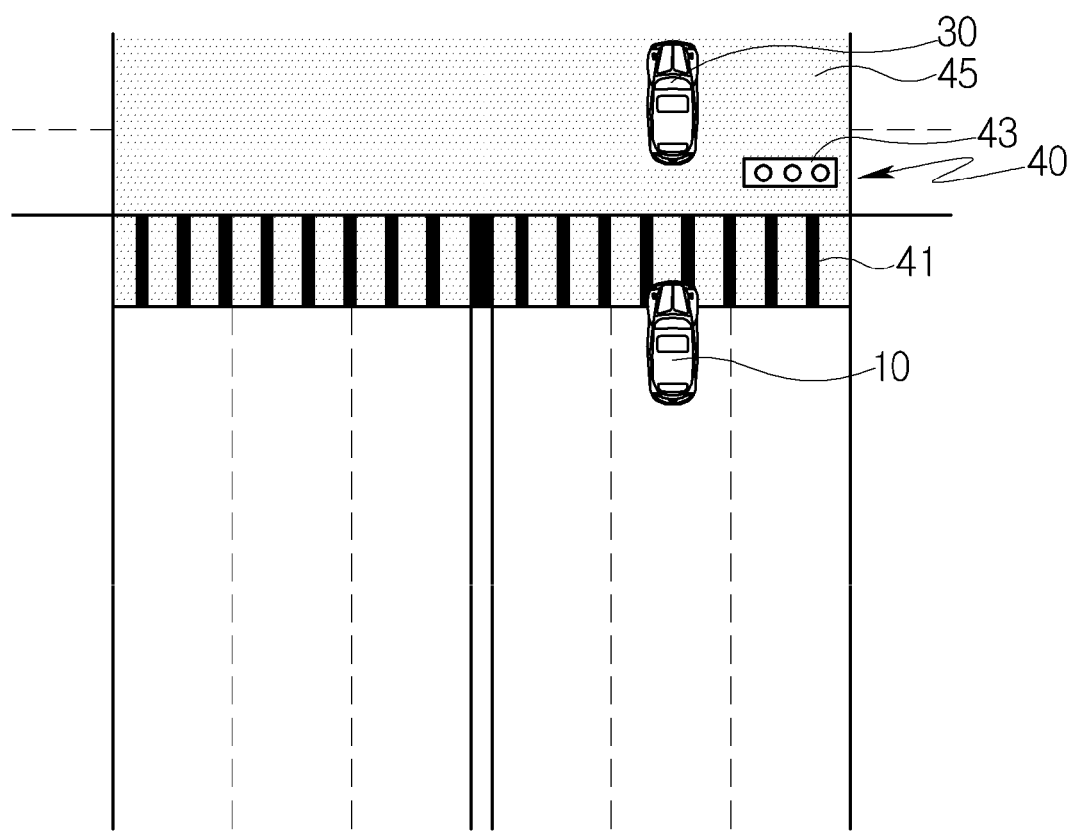

[FIG. 7]
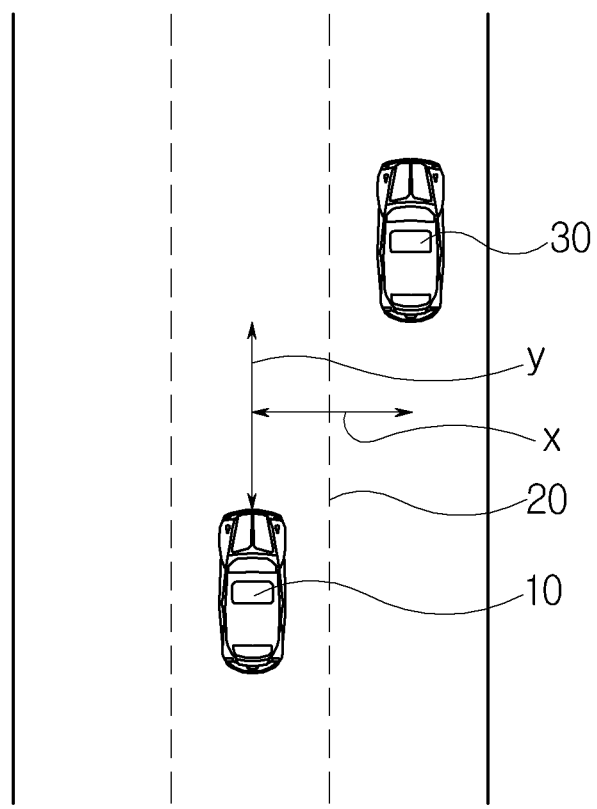

[FIG. 8]
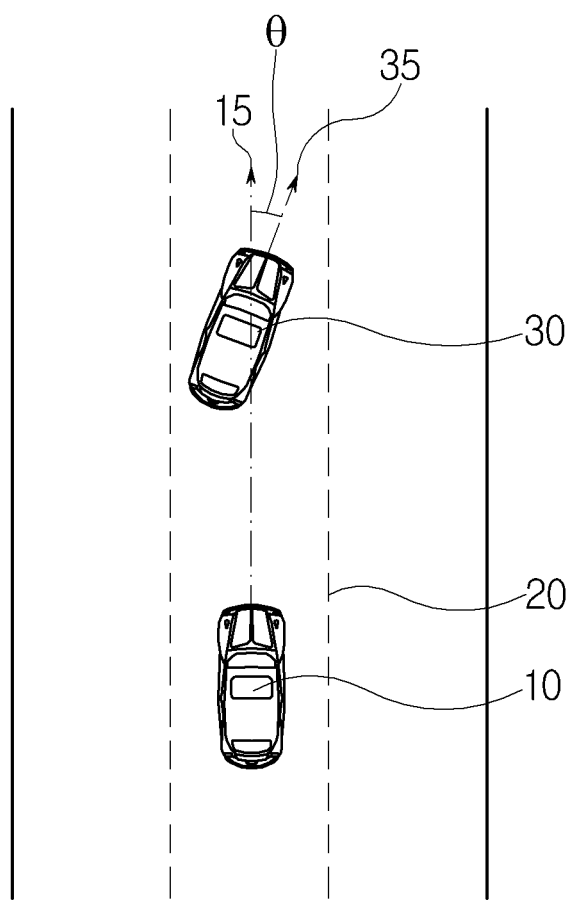

[FIG. 9]
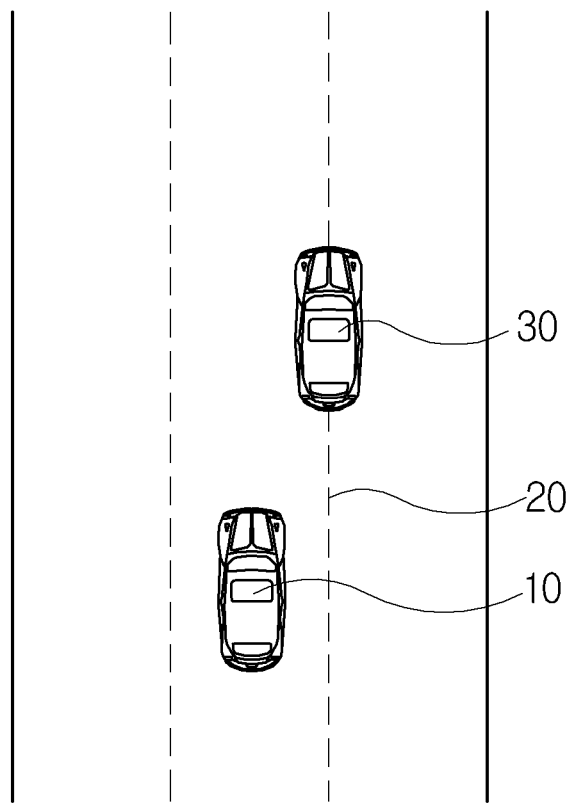

[FIG. 10]
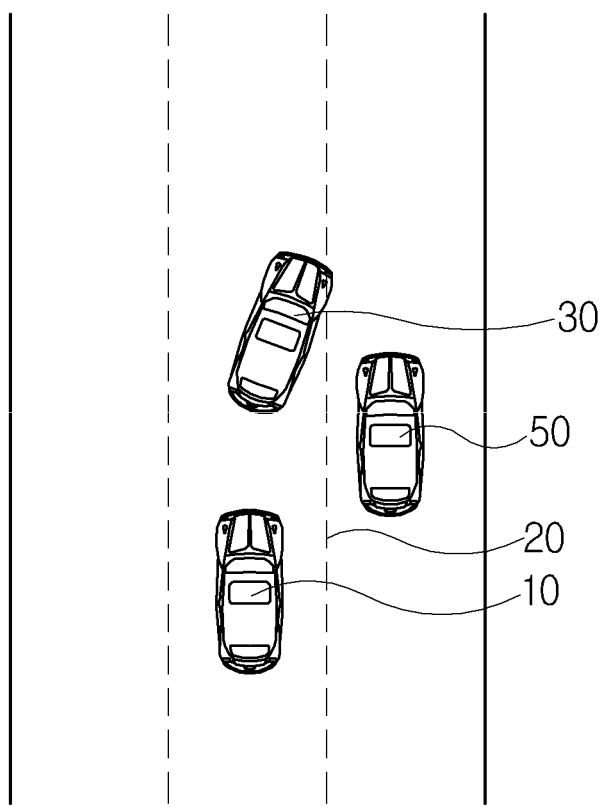

[FIG. 11]
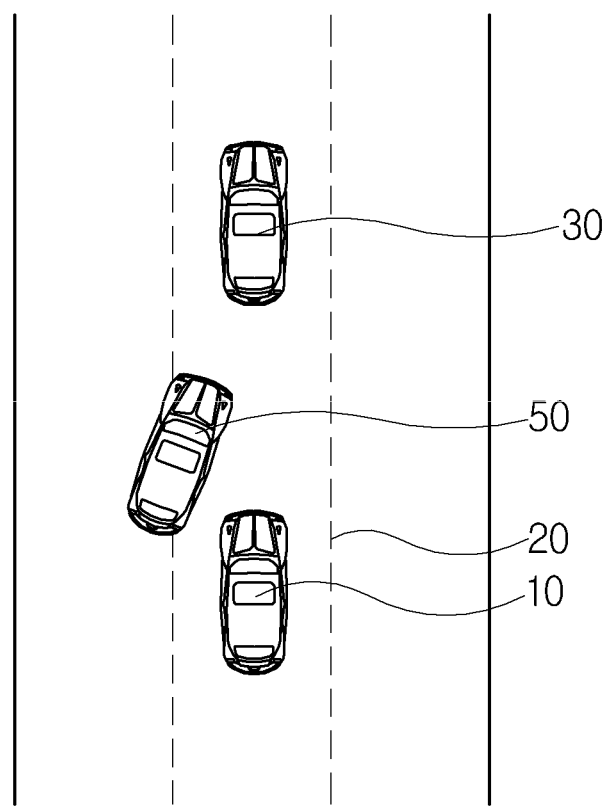

APPARATUS FOR VEHICLE DRIVING ASSISTANCE

CROSS-REFERENCE TO RELATED APPLICATION

This application is a continuation of U.S. application Ser. No. 16/214,959 filed on Dec. 10, 2018, now U.S. Pat. No. 10,431,096, which is the continuation of U.S. application Ser. No. 15/652,237 filed on Jul. 18, 2017 in the U.S. Patent and Trademark Office, now U.S. Pat. No. 10,490,083, which claims priority to Korean Patent Application No. 10-2016-0091297 filed on Jul. 19, 2016, the disclosures of which are incorporated herein by reference in their entireties.

BACKGROUND

Technical Field

An apparatus for assisting driving of a vehicle, and more particularly an apparatus for assisting driving of a vehicle, maintains a stable drive path by recognizing road conditions including intersections, crosswalks, and the like, a preceding vehicle, and forward lane markings.

Description of the Related Art

With the improvement of various functions for a vehicle, various technologies for improving the safety and convenience of a driver and passengers of a vehicle are introduced. Particularly in a vehicle driving control system, a Lane Keeping Assist System (hereinafter, abbreviated to LKAS) is an integral system for the safety of a driver. Such an LKAS generally recognizes lane markings using a camera and senses a vehicle driving state, thereby warning of a lane departure or performing lateral control in order to prevent a vehicle from deviating from its lane. However, when lateral control is performed based on the recognition of lane markings using a camera, if recognizable lane markings temporarily disappear in road conditions such as intersections, crosswalks, or the like, or if the performance of the recognition of lane markings is degraded, error may occur in lane-keeping control.

SUMMARY

An object of the present disclosure is to provide an apparatus for assisting driving of a vehicle, which performs lateral control based on the recognition of lane markings when it is possible to recognize the lane markings, and performs lateral control by following a preceding vehicle in road conditions in which it is impossible or difficult to recognize lane markings, such as intersections, crosswalks, or the like.

Other objects and advantages of the present disclosure can be understood by the following description, and become apparent with reference to the embodiments of the present disclosure. Also, the present methods and systems can be realized by the various combinations of the features claimed and described herein.

In accordance with one aspect of the disclosure, an apparatus for assisting driving of a host vehicle includes an image sensor capturing images of an area in front of the host vehicle; and a controller communicatively connected to the image sensor capturing images of the area in front of the host vehicle. The controller is configured to recognize a section of a road having lane markings and a section of the road having no lane markings on a drive path of the host vehicle; recognize, based on images captured by the image sensor, forward lane markings provided in a direction in which the host vehicle is proceeding; recognize a preceding vehicle that is located ahead of the host vehicle; and perform lateral control of the host vehicle selectively based on the forward lane markings and the recognized preceding vehicle, according to whether the section of the road having no lane markings is recognized.

The controller may be further configured to control steering of the host vehicle as part of performing lateral control of the host vehicle.

When the section of the road having no lane markings is recognized, the controller may periodically determine a distance from the host vehicle to a point at which the section of the road having no lane markings starts in the direction in which the host vehicle is proceeding.

The controller may perform the lateral control of the host vehicle based on adjusted weights assigned to information of the forward lane markings and information of the recognized preceding vehicle and, when the forward lane markings and the preceding vehicle are recognized, the controller may perform the lateral control of the host vehicle by assigning a higher weight to the information of the recognized preceding vehicle than to the information of the forward lane markings if the distance between the host vehicle and the section of the road having no lane markings is less than a reference value.

The controller may perform the lateral control of the host vehicle based on adjusted weights assigned to information of the forward lane markings and information of the recognized preceding vehicle and, when the forward lane markings and the preceding vehicle are recognized, the controller may perform the lateral control of the host vehicle by assigning a higher weight to the information of the forward lane markings than to the information of the recognized preceding vehicle if the distance between the host vehicle and the section of the road having no lane markings is greater than a reference value.

The controller may be further configured to, before the host vehicle enters the section of the road having no lane markings, perform lateral control of the host vehicle based only on the recognized preceding vehicle, from among the forward lane markings and the recognized preceding vehicle, if the forward lane markings are not recognized but the preceding vehicle is recognized.

The controller may be further configured to, before the host vehicle enters the section of the road having no lane markings, perform lateral control of the host vehicle based only on the forward lane markings, from among the forward lane markings and the recognized preceding vehicle, if the forward lane markings are recognized.

The controller may stop lateral control of the host vehicle in response to determining that the preceding vehicle is driving over a forward lane marking.

When the host vehicle is driving in the section having no lane markings, the controller may control the host vehicle to follow the preceding vehicle and perform lateral control of the host vehicle based on the information acquired by recognizing the preceding vehicle.

When the forward lane markings are not recognized but the preceding vehicle is recognized, the controller may control the host vehicle to follow the preceding vehicle and perform lateral control of the host vehicle based on the information acquired by recognizing the preceding vehicle.

When a lateral separation distance between the host vehicle and the preceding vehicle is equal to or less than a reference distance, the controller may perform lateral control of the host vehicle based on information acquired by recognizing the preceding vehicle.

When an angle between a first direction in which the host vehicle is proceeding and a second direction in which the preceding vehicle is proceeding is equal to or greater than a reference angle, the controller may control the host vehicle to stop following the preceding vehicle and stop the lateral control of the host vehicle.

When the preceding vehicle changes orientation by an angle that is equal to or greater than a reference angle, the controller may control the host vehicle to stop following the preceding vehicle and stop the lateral control of the host vehicle.

When the preceding vehicle changes orientation by an angle that is equal to or less than a reference angle and a risk of a collision between the host vehicle and another vehicle in an adjacent lane is detected, the controller may control the host vehicle to stop following the preceding vehicle and stops the lateral control of the host vehicle.

When another vehicle cuts in between the host vehicle and the preceding vehicle, the controller may control the host vehicle to stop following the preceding vehicle and stops the lateral control of the host vehicle.

When a speed of the preceding vehicle becomes equal to or greater than a preset speed, the controller may control the host vehicle to stop following the preceding vehicle and stops the lateral control of the host vehicle.

The controller may recognize the section of the road having no lane markings using at least one of information received from a GPS, information acquired by recognizing an intersection ahead of the host vehicle based on an image captured by the image sensor, or information acquired by recognizing traffic lights ahead of the host vehicle based on an image captured by the image sensor.

The apparatus may further include a camera mounted to the host vehicle as the image sensor.

The apparatus may further include an ultrasonic sensor mounted to the host vehicle, wherein the ultrasonic sensor acquires the distance between the host vehicle and the section of the road having no lane markings.

In accordance with a further aspect of the disclosure, an apparatus for assisting driving of a host vehicle includes an image sensor capturing images of an area in front of the host vehicle; and a controller communicatively connected to the image sensor capturing images of the area in front of the host vehicle. The controller is configured to recognize a section of a road having lane markings and a section of the road having no lane markings on a drive path of the host vehicle; recognize, based on images captured by the image sensor, forward lane markings provided in a direction in which the host vehicle is proceeding; recognize a preceding vehicle that is proceeding ahead of the host vehicle; and control the host vehicle to follow the preceding vehicle and perform lateral control of the host vehicle based on information on at least one of the recognized section of the road having lane markings, the recognized section of the road having no lane markings, the recognized forward lane markings, or the recognized preceding vehicle. The controller controls the host vehicle based on the information on the recognized forward lane markings when the host vehicle is driving in the section of the road having lane markings, and controls the host vehicle based on the information on the recognized preceding vehicle when the host vehicle is driving in the section of the road having no lane markings.

When the host vehicle is driving in the section of the road having lane markings and the controller recognizes the preceding vehicle, the controller may perform lateral control of the host vehicle by assigning a non-zero weight to the information on the recognized forward lane markings, among the information on the recognized forward lane markings and the information on the recognized preceding vehicle.

When the host vehicle is driving in the section of the road having lane markings and a distance between the host vehicle and the section of the road having no lane markings is less than a reference value, the controller may perform lateral control of the host vehicle by assigning a higher weight to the information on the recognized preceding vehicle than to the information on the recognized forward lane markings.

The controller may warn of release of lateral control of the host vehicle when neither the preceding vehicle nor the forward lane markings is recognized.

In accordance with a further aspect of the disclosure, an apparatus for assisting driving of a host vehicle includes an image sensor capturing images of an area in front of the host vehicle; and a controller communicatively connected to the image sensor capturing images of the area in front of the host vehicle. The controller is configured to recognize, based on images captured by the image sensor, forward lane markings provided in a section of a road having lane markings in a direction in which the host vehicle is proceeding; in response to recognizing the forward lane markings, perform lateral steering control of the host vehicle in the section of the road having lane markings based on the forward lane markings; recognize a section of a road having no lane markings on the drive path of the host vehicle; and in response to recognizing the section of the road having no lane markings, changing the lateral steering control of the host vehicle to perform lateral steering control of the host vehicle in the section of the road having no lane markings based on a preceding vehicle that is located ahead of the host vehicle on the road.

The apparatus may further include a GPS receiver configured for receiving a GPS information signal. The controller may be communicatively connected to the GPS receiver, and may be configured to recognize a current position of the host vehicle based on navigation map and the received GPS information signal and to recognize the section of the road having no lane markings based on information of the navigation map.

The controller may be configured to recognize the section of the road having no lane markings based on recognizing in images captured by the image sensor at least one of an intersection ahead of the host vehicle or a traffic light ahead of the host vehicle.

The controller may be configured to recognize the preceding vehicle that is located ahead of the host vehicle based on images captured by the image sensor in the area in front of the host vehicle or based on a laser or ultrasonic sensor configured to recognize longitudinal and lateral distances from the host vehicle to the preceding vehicle.

The controller may be further configured to, when performing lateral steering control of the host vehicle based on the preceding vehicle: recognize, based on images captured by the image sensor, forward lane markings provided in the section of the road having lane markings in the direction in which the host vehicle is proceeding; and in response to recognizing the section of the road having lane markings, changing the lateral steering control of the host vehicle to perform lateral steering control of the host vehicle in the section of the road having lane markings based on the forward lane markings.

The controller may change the lateral steering control of the host vehicle to perform lateral steering control of the host vehicle in the section of the road having no lane markings based on the preceding vehicle that is located ahead of the host vehicle on the road in response to recognizing the section of the road having no lane markings and recognizing that a distance between the host vehicle and the section of the road having no lane markings is less than a reference value.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram that schematically shows the configuration of an apparatus for assisting driving of a vehicle according to an embodiment of the present disclosure;

FIG. 2 is a block diagram that schematically shows the configuration of a controller according to an embodiment of the present disclosure;

FIG. 3 is a view for explaining the lateral control of a host vehicle according to an embodiment of the present disclosure;

FIGS. 4 and 5 are views that show a method for assisting driving of a vehicle based on a section having no lane markings according to an embodiment of the present disclosure;

FIG. 6 is a view for explaining the control of a host vehicle when the host vehicle enters a section having no lane markings according to an embodiment of the present disclosure; and FIGS. 7 to 11 are views for explaining the release of a control system according to embodiments of the present disclosure.

DETAILED DESCRIPTION

Terms or words used hereinafter should not be construed as having common or dictionary meanings, but should be construed as having meanings and concepts that comply with the technical spirit of the present disclosure. Accordingly, the following description and drawings illustrate exemplary embodiments that are generally illustrative of the scope of the present disclosure, and various equivalents and modifications of the embodiments fall within the scope of the disclosure.

Embodiments of the present disclosure are described in detail below with reference to the accompanying drawings.

In the drawings, the width, length, thickness, etc. of each element may have been enlarged for convenience. Furthermore, when it is described that one element is disposed 'over' or 'on' the other element, one element may be disposed 'right over' or 'right on' the other element or a third element may be disposed between the two elements. The same reference numbers are used throughout the specification to refer to the same or like parts.

FIG. 1 is a block diagram that schematically shows the configuration of an apparatus for assisting driving of a vehicle according to an embodiment of the present disclosure.

Referring to FIG. 1, the apparatus 100 for assisting driving of a vehicle according to an embodiment of the present disclosure includes a road information recognition unit 110, a lane information generation unit 120, a vehicle recognition unit 130, a controller 140, and a GPS information reception unit 150.

The road information recognition unit 110 detects the position of a vehicle using a GPS signal, input from the GPS information reception unit 150, and recognizes a section including an intersection, a crosswalk, traffic lights, or the like on a drive path, along which the vehicle is driving, using road information based on the current position of the vehicle and road information recognized using a camera. As a result, the road information recognition unit 110 may recognize road information about a section having lane markings and a section having no lane markings. The section having no lane markings may be a section in which lane markings temporarily disappear, that is, a section in which no lane markings are drawn. For example, the road information recognition unit 110 recognizes road information of a drive path based on the position of a vehicle using the map of a navigation device installed in advance in the vehicle or the map of an Advanced Driver Assistance System (ADAS). Here, the position of the vehicle is detected from a GPS signal received via the GPS information reception unit 150 of the vehicle, and the road information of a drive path based on the current position of the vehicle is recognized using the map of the navigation device or the map of the ADAS. Here, the road information recognition unit 110 provides the controller 140 with information about the position of a section having no lane markings that is present on the drive path. Particularly, the road information recognition unit 110 periodically provides the controller 140 with information about a distance from the current position of the vehicle to the position of the section having no lane markings.

In another example, the road information recognition unit 110 may recognize road information, such as an intersection ahead of the vehicle, traffic lights ahead of the vehicle, or the like, using a camera. That is, the road information recognition unit 110 may recognize a section having no lane markings, located ahead of the vehicle in the direction in which the vehicle is driving, using a camera. The road information recognition unit 110 may provide information about the section having no lane markings, recognized using a camera, to the controller 140. Also, information about the distance from the current position of the vehicle to the position of the section having no lane markings may be acquired using a separate ultrasonic sensor provided to the vehicle.

The lane information generation unit 120 generates lane information by recognizing lane markings on both sides of a road in front of the vehicle. To this end, the lane information generation unit 120 may include a camera (e.g., image sensor) for sensing and generating the image of lane markings. The lane information generation unit 120 may acquire lane information through the following method.

For example, the lane information generation unit 120 may acquire lane information using the difference between the gradation value of a lane marking and that of a part that is not a lane marking in the image of a road, or may acquire lane information by extracting dotted lines and lines from the image of a road. However, the lane information generation unit 120 may not acquire lane information due to the influence of an external environment, such as weather or the like, and may not acquire lane information when lane markings are hidden by a preceding vehicle that is driving ahead of the host vehicle.

The vehicle recognition unit 130 recognizes a vehicle preceding the host vehicle. For example, the vehicle recognition unit 130 generates the image of the front of the host vehicle, sets a region of interest in the image, detects the edges of a subject within the region of interest, and recognizes an edge that matches a criterion for a vehicle, among the edges of the subject, as the preceding vehicle.

The preceding vehicle may be recognized using a method other than the above-mentioned method. The vehicle recognition unit 130 includes a laser or an ultrasonic wave, and may recognize a preceding vehicle using information thereabout including longitudinal and lateral distances from the vehicle to the preceding vehicle, the relative speed in the longitudinal and lateral directions, and the like.

The controller 140 may perform the lateral control of the host vehicle based on information acquired by the road information recognition unit 110, the lane information generation unit 120 and the vehicle recognition unit 130. Specifically, the controller 140 assigns a weight to each of information about the forward lane markings and information about the preceding vehicle based on whether lane markings and a section having no lane markings are recognized, thereby performing the lateral control of the host vehicle. The controller 140 may assign a weight that ranges from "0" to "100" to each of information about the forward lane markings and information about the preceding vehicle. The total of the weights assigned to the information about the forward lane markings and the information about the preceding vehicle does not exceed 100. For example, the controller 140 may assign the weights "0" and "100" to information about the forward lane markings and information about the preceding vehicle, respectively, thereby controlling the host vehicle using only the information about the preceding vehicle. In another example, the controller 140 may assign the weights "100" and "0" to information about the forward lane markings and information about the preceding vehicle, respectively, thereby controlling the host vehicle using only the information about the forward lane markings.

Also, the controller 140 may release the control of the host vehicle when neither a preceding vehicle nor forward lane markings are recognized. In an embodiment of the present disclosure, a host vehicle is described as being controlled based on information about a preceding vehicle and information about forward lane markings. Therefore, when neither a preceding vehicle nor forward lane markings are recognized, the controller 140 may disable the control system, so that a driver manually controls the vehicle in order to reduce the risk of accidents.

FIG. 2 is a block diagram that schematically shows the configuration of a controller according to an embodiment of the present disclosure.

As illustrated in FIG. 2, the controller 140 includes a lane-tracking information unit 210, a vehicle trajectory information unit 220, a steering control target adjustment unit 230, a steering controller 240, and a system release warning unit 250.

The lane-tracking information unit 210 receives information about forward lane markings from the lane information generation unit 120 and generates lane-tracking information for keeping a vehicle in its lane.

The lane-tracking information unit 210 provides the generated lane-tracking information to the steering control target adjustment unit 230.

The lane-tracking information may be generated through the following method.

For example, using lane information, the lane-tracking information unit 210 may generate lane-tracking information such that the difference between half of a lane width and a distance from the center of the host vehicle on a vehicle trajectory to either of two lane markings falls within a constant error range.

The vehicle trajectory information unit 220 receives information about a preceding vehicle from the vehicle recognition unit 130 and generates information about the trajectory of the preceding vehicle.

The vehicle trajectory information unit 220 provides information about the trajectory of the preceding vehicle to the steering control target adjustment unit 230.

The information about the trajectory of the preceding vehicle may be generated through the following method.

For example, the vehicle trajectory information unit 220 calculates the position of a preceding vehicle in an image, the size of the preceding vehicle in the image, and an angle between a camera and the preceding vehicle depending on a steering-wheel angle of a host vehicle, which is input from a steering-wheel angle sensor or a torque sensor, and on a yaw rate input from a yaw rate sensor, and may generate information about the trajectory of the preceding vehicle based on the position, the size, and the angle of the preceding vehicle.

Also, the vehicle trajectory information unit 220 detects the current position of the preceding vehicle using longitudinal and lateral distances from the host vehicle to the preceding vehicle, predicts the position of the preceding vehicle after a certain time using the relative speed of the preceding vehicle in the longitudinal and lateral directions, and thereby generates information about the trajectory of the preceding vehicle.

The steering control target adjustment unit 230 receives the distance between the host vehicle and a section having no lane markings, lane-tracking information for keeping a lane, and trajectory information for following the preceding vehicle from the road information recognition unit 110, the lane-tracking information unit 210 and the vehicle trajectory information unit 220, and delivers a signal for controlling steering of the host vehicle to the steering controller 240 or delivers a signal for releasing the steering control device to the system release warning unit 250 depending on the positions of the section having no lane markings and the host vehicle.

Specifically, the steering control target adjustment unit 230 receives information about a section having no lane markings that is present on the drive path from the road information recognition unit 110, and measures a distance from the host vehicle to the section having no lane markings.

During the control operation for keeping a lane based on the forward lane markings, the vehicle recognition unit 130 may recognize a preceding vehicle before entering the section having no lane markings.

When the lane information generation unit 120 recognizes forward lane markings and if the vehicle recognition unit 130 recognizes a preceding vehicle, the lane-tracking information unit 210 provides lane-tracking information for enabling a vehicle to keep its lane to the steering control target adjustment unit 230, and the vehicle trajectory information unit 220 provides trajectory information for following the preceding vehicle to the steering control target adjustment unit 230. The steering control target adjustment unit 230 delivers a control signal for keeping the lane to the steering controller 240 when the distance from the host vehicle to the section having no lane markings is greater than a reference value. However, when the distance from the host vehicle to the section having no lane markings is equal to or less than the reference value, the steering control target adjustment unit 230 changes the control signal for keeping the lane based on the forward lane markings to a control signal for following the preceding vehicle, and delivers the changed control signal to the steering controller 240.

During the control operation for keeping a lane based on the forward lane markings, if the vehicle recognition unit 130 cannot recognize a preceding vehicle before entering the section having no lane markings, the vehicle trajectory information unit 220 may not provide trajectory information for following a preceding vehicle to the steering control target adjustment unit 230. However, while the forward lane markings are being recognized, the lane-tracking information unit 210 provides the lane-tracking information for keeping the lane to the steering control target adjustment unit 230. The steering control target adjustment unit 230 delivers a control signal for keeping the lane based on the forward lane markings to the steering controller 240.

While a vehicle is driving in a section having no lane markings, the lane information generation unit 120 may not recognize any lane marking ahead of the vehicle, but the vehicle recognition unit 130 may recognize a preceding vehicle.

The vehicle trajectory information unit 220 provides trajectory information for following the preceding vehicle to the steering control target adjustment unit 230. The steering control target adjustment unit 230 changes the control signal for keeping a lane based on the forward lane markings to a control signal for following the preceding vehicle, and delivers the changed control signal to the steering controller 240.

If the vehicle recognition unit 130 does not recognize a preceding vehicle while the host vehicle is driving in a section having no lane markings, the lane-tracking information unit 210 and the vehicle trajectory information unit 220 may not provide lane-tracking information for keeping a lane and trajectory information for following a preceding vehicle to the steering control target adjustment unit 230. Therefore, the steering control target adjustment unit 230 delivers a control signal for warning of the release of the apparatus for assisting driving of a vehicle to the system release warning unit 250.

After the host vehicle passes the section having no lane markings, the lane information generation unit 120 may again recognize forward lane markings. The lane-tracking information unit 210 provides lane-tracking information for keeping a lane based on the forward lane markings to the steering control target adjustment unit 230. The steering control target adjustment unit 230 delivers a control signal for keeping the lane to the steering controller 240. The steering controller 240 controls steering of the vehicle depending on the control signal for keeping the lane based on the forward lane markings or the control signal for following the preceding vehicle, which is received from the steering control target adjustment unit 230.

The system release warning unit 250 warns a driver of the release of the apparatus for assisting driving of a vehicle when it is impossible to control steering of the vehicle because neither forward lane markings nor a preceding vehicle is recognized. The system release warning unit 250 may give a warning using sound, images, vibration, or the like, and derives the driver to drive the vehicle by himself or herself.

FIG. 3 is a view for explaining the lateral control of a host vehicle according to an embodiment of the present disclosure.

Referring to FIG. 1 and FIG. 3, the apparatus 100 for assisting driving of a vehicle may perform lateral control of a host vehicle 10 and following of a preceding vehicle 30 before entering a section having no lane markings. The road information recognition unit 110 may recognize information about a road 40 ahead of the host vehicle 10, the lane information generation unit 120 may recognize forward lane markings 20 provided in the direction in which the host vehicle 10 is proceeding, and the vehicle recognition unit 130 may recognize the preceding vehicle 30 that is driving ahead of the host vehicle 10. The information about the road 40 may include information about a crosswalk 41, traffic lights 43 and an intersection 45, located ahead of the host vehicle 10. Here, the crosswalk 41 and the intersection 45 may correspond to a section having no lane markings.

The road information recognition unit 110 may periodically calculate a first distance d1, which is a distance from the host vehicle 10 to the point at which a section having no lane markings starts in the direction in which the host vehicle 10 is proceeding, when the section having no lane markings is recognized, and may provide the distance to the controller 140. In the present embodiment, the point at which a section having no lane markings starts may be the point at which the crosswalk 41 starts, but it may be the point at which the intersection 45 starts when there is no crosswalk 41. Also, the point at which the section having no lane markings starts may indicate the end point of a section in which the forward lane markings 20 are recognized.

For example, when the forward lane markings 20 and the preceding vehicle 30 are recognized, the controller 140 may perform the lateral control of the host vehicle 10 by assigning a higher weight to information about the preceding vehicle 30 than to information about the forward lane markings 20 as the first distance d decreases so as to become less than a reference value. That is, when the first distance d is less than the reference value, the controller 140 may perform the lateral control of the host vehicle 10 based on information about the preceding vehicle 30. Here, the reference value may be adjusted when the control system of the host vehicle 10 is configured. When the first distance d is less than the reference value, the host vehicle 10 may not recognize information about the forward lane markings 20 or may not recognize the same soon. In other words, when the first distance d is less than the reference value, if the host vehicle 10 is controlled by assigning a higher weight to information about the forward lane markings 20, the risk of a collision between the host vehicle 10 and the preceding vehicle 30 may increase.

In another example, when the forward lane markings 20 and the preceding vehicle 30 are recognized, the controller 140 may perform the lateral control of the host vehicle 10 by assigning a higher weight to information about the forward lane markings 20 than to information about the preceding vehicle 30 if the first distance d is greater than the reference value. When the host vehicle 10 is driving on a road having lane markings, if the lateral control of the host vehicle 10 is performed based on forward lane markings 20, the continuity of lateral control may be maintained even when the preceding vehicle 30 deviates from its lane.

Also, the controller 140 may control the host vehicle 10 based on information about the forward lane markings 20 and/or the preceding vehicle 30 regardless of whether it receives information about a section having no lane markings from the road information recognition unit 110. If the forward lane markings 20 are recognized before entering the section having no lane markings, the controller 140 may perform the lateral control of the host vehicle 10 based on the recognized information. However, when the forward lane markings 20 are not recognized but the preceding vehicle 30 is recognized, the controller 140 may perform the lateral control of the host vehicle 10 based on information about the preceding vehicle 30. That is, the controller 140 controls the host vehicle 10 by default based on information about the forward lane markings 20 when the host vehicle 10 is driving on a road having lane markings, but may control the host vehicle 10 exceptionally based on information about the preceding vehicle 30 when information about the forward lane markings 20 cannot be recognized.

For example, the controller 140 may perform the lateral control of the host vehicle 10 and following of the preceding vehicle 30 based on information about the preceding vehicle 30 when forward lane markings 20 are not recognized but the preceding vehicle 30 is recognized. The controller 140 receives information about a lateral separation distance x between the host vehicle 10 and the preceding vehicle 30 and a longitudinal separation distance y therebetween from the vehicle recognition unit 130, and may control the host vehicle 10 based on the received information. The controller 140 may perform the lateral control of the host vehicle 10 and following of the preceding vehicle 30 only when the lateral separation distance x and the longitudinal separation distance y are equal to or less than reference distances. When the lateral separation distance x and the longitudinal separation distance y are equal to or greater than the reference distances, because the reliability of information about the preceding vehicle 30 decreases, it is desirable for the controller 140 to control the host vehicle 10 based on information about the forward lane markings 20 rather than on information about the preceding vehicle 30.

According to an embodiment of the present disclosure, the controller 140 may control the host vehicle 10 based on information about a section having no lane markings, which is received from the road information recognition unit 110, and may control the host vehicle 10 depending on information about the forward lane markings 20 and/or the preceding vehicle 30 without information about the section having no lane markings. That is, the apparatus 100 for assisting driving of a vehicle according to an embodiment of the present disclosure may vary a method of lateral control of the host vehicle 10 depending on whether a section having no lane markings is recognized. Accordingly, the apparatus 100 for assisting driving of a vehicle may provide various embodiments for safely controlling the host vehicle 10 based on various road environments and recognized road information.

FIG. 4 and FIG. 5 are views that show a method for assisting driving of a vehicle based on a section having no lane markings according to an embodiment of the present disclosure.

First, lane-keeping control is performed by recognizing forward lane markings at step S10. When the lane information generation unit 120 may not recognize forward lane markings or before the controller 140 receives information about a section having no lane markings from the road information recognition unit 110, steering control is supported by a lane-keeping assist system.

During a lane-keeping control operation, it is determined at step S20 whether a section having no lane markings is recognized by the road information recognition unit 110. If the road information recognition unit 110 may not recognize a section having no lane markings on a preset path, the controller 140 maintains the lane-keeping control operation at step S50 while the lane information generation unit 120 may recognize forward lane markings.

However, if the controller 140 determines that a section having no lane markings is present on a drive path through the road information recognition unit 110, whether the vehicle recognition unit 130 recognizes a preceding vehicle is determined at step S30 before entering the section having no lane markings.

If a preceding vehicle is not recognized through the vehicle recognition unit 130, the lane-keeping control operation is maintained at step S50 while the lane information generation unit 120 is capable of recognizing the forward lane markings.

If a preceding vehicle is recognized through the vehicle recognition unit 130, the steering control target adjustment unit 230 compares a reference value with a distance between the section having no lane markings and the host vehicle at step S40.

The road information recognition unit 110 provides information about a section having no lane markings that is present on a drive path to the steering control target adjustment unit 230.

Also, when the lane information generation unit 120 recognizes forward lane markings and when the vehicle recognition unit 130 recognize a preceding vehicle, the lane-tracking information unit 210 provides lane-tracking information for enabling a vehicle to keep its lane to the steering control target adjustment unit 230, and the vehicle trajectory information unit 220 provides trajectory information for following the preceding vehicle to the steering control target adjustment unit 230. The steering control target adjustment unit 230 delivers a lane-keeping control signal or a control signal for following a preceding vehicle to the steering controller 240 depending on the distance between the host vehicle and the section having no lane markings.

If the distance between the host vehicle and the section having no lane markings is greater than the reference value, the steering control target adjustment unit 230 delivers a control signal for keeping a lane based on the forward lane markings to the steering controller 240.

The steering controller 240 that received the lane-keeping control signal controls steering by maintaining the lane-keeping control method at step S50.

However, if the distance between the host vehicle and the section having no lane markings is equal to or less than the reference value, the steering control target adjustment unit 230 changes the control signal for keeping the lane to a control signal for following the preceding vehicle and delivers the changed control signal to the steering controller 240.

The steering controller 240 that received the control signal for following the preceding vehicle controls steering by changing the lane-keeping control method to a preceding vehicle following method through the recognition of the preceding vehicle at step S60.

While a vehicle is driving in the section having no lane markings, the lane information generation unit 120 may not generate information about forward lane markings, and may thus not perform lane-keeping control at step S70.

However, if the vehicle recognition unit 130 may recognize a preceding vehicle, preceding vehicle following control may be performed. Therefore, whether the vehicle recognition unit 130 recognizes a preceding vehicle is determined at step S80.

If the vehicle recognition unit 130 recognizes a preceding vehicle, the vehicle trajectory information unit 220 delivers trajectory information for following the preceding vehicle to the steering control target adjustment unit 230.

The steering control target adjustment unit 230 delivers a control signal for following the preceding vehicle to the steering controller 240.

The steering controller 240 that received the control signal for following the preceding vehicle controls steering using the preceding vehicle following control method at step S90.

If the vehicle recognition unit 130 may not recognize a preceding vehicle, because steering may not be controlled using the vehicle steering control device, the system release warning unit 250 warns a driver of the release of the steering control function of the host vehicle at step S100. The system release warning unit 250 gives a warning using sound, images, vibration, or the like, and derives the driver to drive the host vehicle by himself or herself.

After passing the section having no lane markings, whether the lane information generation unit 120 again recognizes forward lane markings is determined at step S110.

When the lane information generation unit 120 again recognizes forward lane markings, the lane-tracking information unit 210 delivers lane-tracking information for keeping the lane based on the forward lane markings to the steering control target adjustment unit 230.

The steering control target adjustment unit 230 delivers a control signal for keeping the lane to the steering controller 240.

The steering controller 240 that received the lane-keeping control signal controls steering using the lane-keeping control method at step S120.

FIG. 6 is a view for explaining control of a host vehicle when the host vehicle enters a section having no lane markings according to an embodiment of the present disclosure. A repeated description will be omitted for the conciseness of description.

Referring to FIG. 1 and FIG. 6, the road information recognition unit 110 may recognize information about a road 40 in front of a host vehicle 10. The controller 140 may recognize that the host vehicle 10 will enter a section having no lane markings 41 or 45 soon using the information about the road 40, which is recognized by the road information recognition unit 110. Before the host vehicle 10 enters the section having no lane markings 41 or 45, the controller 140 may check whether information about a preceding vehicle 30 is received. When the host vehicle 10 enters the section having no lane markings 41 or 45, the controller 140 may perform the lateral control of the host vehicle 10 and following of the preceding vehicle 30 based on information about the preceding vehicle 30. When the host vehicle 10 enters the section having no lane markings 41 or 45, the lane information generation unit 120 may not recognize information about forward lane markings 20. Accordingly, the controller 140 may control the host vehicle 10 using only information about the preceding vehicle 30. However, when the vehicle recognition unit 130 does not recognize a preceding vehicle 30, the controller 140 may release the control of the host vehicle 10.

FIGS. 7 to 11 are views for explaining the release of a control system according to embodiments of the present disclosure. FIGS. 7 to 11 are views for explaining conditions for releasing a control system when a host vehicle is controlled based on information about a preceding vehicle. Also, FIGS. 7 to 11 are views that are irrelevant to whether a host vehicle is driving in a section having lane markings or in a section having no lane markings.

Referring to FIG. 1 and FIG. 7, the controller 140 may stop lateral control of a host vehicle 10 when a lateral separation distance x between the host vehicle 10 and a preceding vehicle 30 and a longitudinal separation distance y therebetween are equal to or greater than reference distances. Here, the reference distances may be distances suitable for the host vehicle 10 to follow the preceding vehicle 30 or suitable for performing lateral control based on information about the preceding vehicle 30. For example, a lateral reference distance may be set to about 60 cm, and a longitudinal reference distance may be set to 50 to 70 m. The vehicle recognition unit 130 may recognize the lateral separation distance x and the longitudinal separation distance y between the host vehicle 10 and the preceding vehicle 30, and may deliver information thereabout to the controller 140. When the lateral separation distance x and the longitudinal separation distance y between the host vehicle 10 and the preceding vehicle 30 are equal to or greater than the reference distances, if the controller 140 controls the host vehicle 10 so as to follow the preceding vehicle 30 or performs the lateral control of the host vehicle 10 based on information about the preceding vehicle 30, the risk of a collision between the host vehicle 10 and vehicles around the host vehicle 10 may increase.

Referring to FIG. 1 and FIG. 8, the vehicle recognition unit 130 may recognize a direction in which a preceding vehicle 30 is proceeding, and the controller 140 may recognize a direction in which a host vehicle 10 is proceeding. The direction in which the host vehicle 10 is proceeding may be defined as a first direction 15, and the direction in which the preceding vehicle 30 is proceeding may be defined as a second direction 35. For example, when an angle between the first direction 15 and the second direction 35 is equal to or greater than a reference angle, the controller 140 may stop following of the preceding vehicle 30 and lateral control of the host vehicle 10. In another example, when the preceding vehicle 30 changes the orientation thereof by an angle that is equal to or greater than the reference angle by suddenly turning the steering wheel thereof, the controller 140 may stop following of the preceding vehicle 30 and lateral control of the host vehicle 10. When the angle between the direction in which the host vehicle 10 is proceeding and the direction in which the preceding vehicle 30 is proceeding is greater than certain degrees, if the host vehicle 10 follows the preceding vehicle 30, a collision between the host vehicle 10 and vehicles around the host vehicle 10 may be caused. Furthermore, lateral control of the host vehicle 10 based on information about the preceding vehicle 30 that suddenly changes the orientation thereof may cause a collision with vehicles around the host vehicle 10. In order to prevent such a collision, the controller 140 performs control of the host vehicle 10 based on information acquired by recognizing the direction in which the preceding vehicle 30 is proceeding.

Referring to FIG. 1 and FIG. 9, the lane information generation unit 120 may recognize forward lane markings 20 ahead of a host vehicle 10, and the vehicle recognition unit 130 may recognize a preceding vehicle 30 that is driving ahead of the host vehicle 10. Here, the controller 140 may determine whether the preceding vehicle 30 is driving over a forward lane marking 20 based on information recognized by the lane information generation unit 120 and the vehicle recognition unit 130. If the controller 140 controls the host vehicle 10 using information about the preceding vehicle 30 that is driving over the forward lane marking 20, a collision between the host vehicle 10 and vehicles around the host vehicle 10 may be caused. Therefore, when it is determined that the preceding vehicle 30 is driving over the forward lane marking 20, the controller 140 may stop following of the preceding vehicle 30 and lateral control of the host vehicle 10.

Referring to FIG. 1 and FIG. 10, when an angle between a direction in which a host vehicle 10 is proceeding and a direction in which a preceding vehicle 30 is proceeding is equal to or less than a reference angle, the controller 140 may not stop following of the preceding vehicle 30 and lateral control of the host vehicle 10. However, when the preceding vehicle 30 is crossing over into another lane by changing the orientation thereof, if the host vehicle 10 follows the preceding vehicle 30 using only information about the preceding vehicle 30, the host vehicle 10 may collide with another vehicle 50 that is driving in the other lane. Therefore, even when the angle between the direction in which the host vehicle 10 is proceeding and the direction in which the preceding vehicle 30 is proceeding is equal to or less than the reference angle (or even when the preceding vehicle 30 changes the orientation thereof by an angle that is equal to or less than the reference angle), the controller 140 may stop following of the preceding vehicle 30 and lateral control of the host vehicle 10 if the risk of a collision between the host vehicle 10 and another vehicle 50 in the adjacent lane is detected. Here, the other vehicle 50 may be a vehicle that is already driving in a lane into which the preceding vehicle 30 moves by changing the orientation thereof. That is, the other vehicle 50 may be a vehicle that is likely to collide with the host vehicle 10 if the host vehicle 10 changes the orientation thereof in order to follow the preceding vehicle 30.

Referring to FIG. 1 and FIG. 11, the controller 140 may stop following of a preceding vehicle 30 and lateral control of a host vehicle 10 when another vehicle 50 cuts in between the preceding vehicle 30 and the host vehicle 10. If the controller 140 controls the host vehicle 10 based on information about the other vehicle 50 that cuts in between the host vehicle 10 and the preceding vehicle 30, a collision between the host vehicle 10 and other vehicles around the host vehicle 10 may be caused. Also, the reliability of information about a vehicle ahead of the host vehicle 10 may decrease. Therefore, when another vehicle 50 cuts in between the host vehicle 10 and the preceding vehicle 30, the controller 140 stops control of the host vehicle 10.

According to an embodiment of the present disclosure, control system release conditions for stopping the control of the host vehicle 10 may not be limited to the above-mentioned embodiments. For example, when the speed of the preceding vehicle 30 that is driving ahead of the host vehicle 10 is equal to or greater than a preset speed value, the controller 140 may stop following of the preceding vehicle 30 and lateral control of the host vehicle 10. Here, the preset speed value may be set when the control system is configured. If the host vehicle 10 follows the preceding vehicle 30 that is driving at high speed, this may threaten the safety of the host vehicle 10. Therefore, the preset speed value may be set. For example, the preset speed value may be 55 km/h to 60 km/h, but may not be limited thereto.

An apparatus for assisting driving of a vehicle in accordance with the present disclosure solves a problem of the frequent release of a system, which occurs when it is impossible or difficult to recognize lane markings when lateral control is performed based on lane markings.

Furthermore, a lane departure and a collision with a vehicle on the side or at the rear, which may be caused by moving into another lane when lateral control is performed based on a preceding vehicle, may be prevented.

Also, in a section determined as having no actual lane markings, a warning of the release of a system is given, whereby the reliability of the system may be improved.

While the present disclosure has been described with respect to the specific embodiments, it will be apparent to those skilled in the art that various changes and modifications may be made without departing from the spirit and scope of the disclosure as defined in the following claims.

What is claimed is:

1. An apparatus for assisting driving of a host vehicle, comprising:
    an image sensor capturing images of an area in front of the host vehicle; and
    a controller communicatively connected to the image sensor capturing images of the area in front of the host vehicle and configured to:
    recognize a section of a road having lane markings and a section of the road having no lane markings on a drive path of the host vehicle;
    recognize, based on images captured by the image sensor, forward lane markings provided in a direction in which the host vehicle is proceeding;
    recognize a preceding vehicle that is located ahead of the host vehicle; and
    perform lateral control of the host vehicle selectively based on at least one of the forward lane markings or the recognized preceding vehicle, according to whether the section of the road having no lane markings is recognized,
    wherein the controller recognizes the section of the road having no lane markings using at least one of information received from a GPS, information acquired by recognizing an intersection ahead of the host vehicle based on an image captured by the image sensor, or information acquired by recognizing traffic lights ahead of the host vehicle based on an image captured by the image sensor.

2. The apparatus according to claim 1, wherein the controller is further configured to control steering of the host vehicle as part of performing lateral control of the host vehicle.

3. The apparatus according to claim 1, wherein, when the section of the road having no lane markings is recognized, the controller periodically determines a distance from the host vehicle to a point at which the section of the road having no lane markings starts in the direction in which the host vehicle is proceeding.

4. The apparatus according to claim 3, wherein the controller performs the lateral control of the host vehicle based on adjusted weights assigned to information of the forward lane markings and information of the recognized preceding vehicle and, when the forward lane markings and the preceding vehicle are recognized, the controller performs the lateral control of the host vehicle by assigning a higher weight to the information of the recognized preceding vehicle than to the information of the forward lane markings if the distance between the host vehicle and the section of the road having no lane markings is less than a reference value.

5. The apparatus according to claim 3, wherein the controller performs the lateral control of the host vehicle based on adjusted weights assigned to information of the forward lane markings and information of the recognized preceding vehicle and, when the forward lane markings and the preceding vehicle are recognized, the controller performs the lateral control of the host vehicle by assigning a higher weight to the information of the forward lane markings than to the information of the recognized preceding vehicle if the distance between the host vehicle and the section of the road having no lane markings is greater than a reference value.

6. An apparatus for assisting driving of a host vehicle, comprising:
an image sensor capturing images of an area in front of the host vehicle; and
a controller communicatively connected to the image sensor capturing images of the area in front of the host vehicle and configured to:
recognize a section of a road having lane markings and a section of the road having no lane markings on a drive path of the host vehicle;
recognize, based on images captured by the image sensor, forward lane markings provided in a direction in which the host vehicle is proceeding;
recognize a preceding vehicle that is located ahead of the host vehicle; and
perform lateral control of the host vehicle selectively based on at least one of the forward lane markings or the recognized preceding vehicle, according to whether the section of the road having no lane markings is recognized,
wherein the controller is further configured to, before the host vehicle enters the section of the road having no lane markings, perform lateral control of the host vehicle based only on the recognized preceding vehicle, from among the forward lane markings and the recognized preceding vehicle, if the forward lane markings are not recognized but the preceding vehicle is recognized.

7. An apparatus for assisting driving of a host vehicle, comprising:
an image sensor capturing images of an area in front of the host vehicle; and
a controller communicatively connected to the image sensor capturing images of the area in front of the host vehicle and configured to:
recognize a section of a road having lane markings and a section of the road having no lane markings on a drive path of the host vehicle;
recognize, based on images captured by the image sensor, forward lane markings provided in a direction in which the host vehicle is proceeding;
recognize a preceding vehicle that is located ahead of the host vehicle; and
perform lateral control of the host vehicle selectively based on at least one of the forward lane markings or the recognized preceding vehicle, according to whether the section of the road having no lane markings is recognized,
wherein the controller is further configured to, before the host vehicle enters the section of the road having no lane markings, perform lateral control of the host vehicle based only on the forward lane markings, from among the forward lane markings and the recognized preceding vehicle, if the forward lane markings are recognized.

8. The apparatus according to claim 7, wherein the controller stops lateral control of the host vehicle in response to determining that the preceding vehicle is driving over a forward lane marking.

9. The apparatus according to claim 1, wherein, when the host vehicle is driving in the section having no lane markings, the controller controls the host vehicle to follow the preceding vehicle and performs lateral control of the host vehicle based on the information acquired by recognizing the preceding vehicle.

10. The apparatus according to claim 1, wherein, when the forward lane markings are not recognized but the preceding vehicle is recognized, the controller controls the host vehicle to follow the preceding vehicle and performs lateral control of the host vehicle based on the information acquired by recognizing the preceding vehicle.

11. The apparatus according to claim 10, wherein, when a lateral separation distance between the host vehicle and the preceding vehicle is equal to or less than a reference distance, the controller performs lateral control of the host vehicle based on information acquired by recognizing the preceding vehicle.

12. The apparatus according to claim 10, wherein, when an angle between a first direction in which the host vehicle is proceeding and a second direction in which the preceding vehicle is proceeding is equal to or greater than a reference angle, the controller controls the host vehicle to stop following the preceding vehicle and stops the lateral control of the host vehicle.

13. The apparatus according to claim 10, wherein, when the preceding vehicle changes orientation by an angle that is equal to or greater than a reference angle, the controller controls the host vehicle to stop following the preceding vehicle and stops the lateral control of the host vehicle.

14. The apparatus according to claim 10, wherein, when the preceding vehicle changes orientation by an angle that is equal to or less than a reference angle and a risk of a collision between the host vehicle and another vehicle in an adjacent lane is detected, the controller controls the host vehicle to stop following the preceding vehicle and stops the lateral control of the host vehicle.

15. The apparatus according to claim 10, wherein, when another vehicle cuts in between the host vehicle and the preceding vehicle, the controller controls the host vehicle to stop following the preceding vehicle and stops the lateral control of the host vehicle.

16. The apparatus according to claim 10, wherein, when a speed of the preceding vehicle becomes equal to or greater than a preset speed, the controller controls the host vehicle to stop following the preceding vehicle and stops the lateral control of the host vehicle.

17. The apparatus according to claim 1, wherein the image sensor is a camera mounted to the host vehicle.

18. The apparatus according to claim 1, further comprising an ultrasonic sensor mounted to the host vehicle, wherein the ultrasonic sensor acquires the distance between the host vehicle and the section of the road having no lane markings.

* * * * *